United States Patent [19]

Waters et al.

[11] Patent Number: 5,232,786
[45] Date of Patent: Aug. 3, 1993

[54] MULTI-LAYER STRUCTURES CONTAINING POLYKETONE POLYMERS

[75] Inventors: Dixie G. Waters; Nicholas Michaels, both of Houston, Tex.

[73] Assignee: Shell Oil Company, Houston, Tex.

[21] Appl. No.: 880,947

[22] Filed: May 8, 1992

[51] Int. Cl.5 .............................................. B32B 27/08
[52] U.S. Cl. .................................. 428/475.8; 428/480; 428/483; 428/516; 428/518
[58] Field of Search ................... 428/461, 475.8, 423.1, 428/421, 516, 518, 480, 483; 525/55, 426; 528/392

[56] References Cited

U.S. PATENT DOCUMENTS

| | | | |
|---|---|---|---|
| 4,600,614 | 7/1986 | Lancaster et al. | 428/461 X |
| 4,647,509 | 3/1987 | Wallace et al. | 428/475.8 X |
| 4,678,713 | 7/1987 | Lancaster et al. | 428/421 |
| 4,808,678 | 2/1989 | Lutz | 525/529 |
| 4,816,514 | 3/1989 | Lutz | 525/55 |
| 4,818,786 | 4/1989 | Gergen et al. | 525/55 |
| 4,818,798 | 4/1989 | Gergen | 525/55 X |
| 4,839,437 | 6/1989 | Gergen et al. | 525/426 |
| 4,871,618 | 10/1989 | Kinneberg et al. | 428/461 |
| 4,880,904 | 11/1989 | Kinneberg et al. | 528/392 |
| 4,935,304 | 6/1990 | Danforth | 428/423.1 |
| 4,996,086 | 2/1991 | Gerlowski et al. | 427/421 |
| 5,043,389 | 8/1991 | Gergen et al. | 525/179 |
| 5,064,724 | 11/1991 | Ofstein | 428/516 X |

FOREIGN PATENT DOCUMENTS 191690  1/1986  European Pat. Off. .

Primary Examiner—Thomas J. Herbert, Jr.
Attorney, Agent, or Firm—James O. Okorafor

[57] ABSTRACT

A coextruded multi-layer structure may be formed by coextruding a linear alternating polymer of carbon monoxide and at least one ethylenically unsaturated hydrocarbon (a polyketone polymer) with an other thermoplastic polymer, without the use of an adhesive or tie layer. The multi-layer structures exhibit strong adhesion but can be easily separated (for recycling, etc.) once the integrity of either layer is impaired. The other thermoplastic polymer is a cracked polybutylene, nylon-6, nylon-12, a copolyetherester polymer, or polyvinyl chloride.

15 Claims, No Drawings

MULTI-LAYER STRUCTURES CONTAINING POLYKETONE POLYMERS

FIELD OF THE INVENTION

This invention relates to polyketone polymers, and, more particularly, to a multi-layer structure of a polyketone polymer and an other thermoplastic polymer, prepared without the use of an adhesive or tie layer.

BACKGROUND OF THE INVENTION

Coextrusion of multiple layers of different polymers through a common die is used to produce a variety of polymer products, such as sheet, film, coatings, profiles, pipe, tubing, and foam-core products. Food and beverage packaging is a common application of such coextruded products. Sheet or film, for example, are often shaped after coextrusion into various packaging items by methods such as thermoforming, solid-phase pressure forming, or stamping. Individual polymers exhibit a wide variety of properties, such as permeability to oxygen, water vapor, and other gases and liquids, and chemical resistance to acids, bases, hydrocarbons, oils, alcohols, and other materials. Coextrusion of multiple polymer layers can be used to prepare a product with optimum properties for a particular application.

No comprehensive theory exists for predicting interlayer adhesion in coextrusion of different polymers. Most knowledge comes from trial-and-error testing of the polymers. Different polymers, when coextruded, will typically exhibit good adhesion or no adhesion. Adhesive polymers are commonly used as "tie layers" to bond incompatible polymers that do not normally adhere to each other. Ethylene-vinyl acetate, ethylene-acrylic acid, and ethylene-methyl acrylate copolymers are commonly used as tie layers.

There is currently an increasing emphasis on reducing the volume of plastic packaging waste, and on recycling plastic materials. In the future, it is expected that additional emphasis will be placed on recycling of other plastic articles, such as auto parts. Although coextrusion of multiple polymer layers can be used to prepare a product with optimum properties, such polymer products are also difficult to recycle. Coextrusion of a multi-layer structure that appears to exhibit good adhesion, yet delaminates readily for recycling, would be very useful. It is an object of this invention to provide a coextruded product, of two or more dissimilar polymer layers that appear to exhibit good adhesion, yet will separate readily for recycling.

In particular, it is an object of this invention to provide a coextruded multi-layer structure of a polyketone polymer and an other thermoplastic polymer which appears to adhere to the polyketone polymer, yet separates easily from the polyketone polymer when the integrity of either layer is impaired. Surprisingly, after extensive trial-and-error testing, only five other thermoplastic polymers have been found that meet this objective.

SUMMARY OF THE INVENTION

The present invention provides a coextruded multi-layer structure of a polyketone polymer and an other thermoplastic polymer wherein the two polymers appear to exhibit good adhesion without the use of an adhesive or tie layer. The other thermoplastic polymers of the invention include cracked polybutylenes, nylon-6, nylon-12, copolyetheresters, and polyvinyl chloride.

Since no adhesive or tie layer is required, the multi-layer structures typically include only two layers. In one alternative, the multi-layer structure may include three layers, wherein either the other thermoplastic polymer is sandwiched between two layers of the polyketone polymer, or the polyketone polymer is sandwiched between two layers of the other polymer. In another alternative, the polyketone polymer may be sandwiched between two different other thermoplastic polymers of the invention. Multi-layer structures which include one or more layers of polyketone polymer and one or more layers of an other thermoplastic polymer, wherein the multi-layer structure includes superimposed layers of a polyketone polymer and an other thermoplastic polymer which appear to adhere to each other until the integrity of either layer is impaired, are also considered to be within the scope of this invention. The multi-layer structures of the invention may be flat, such as sheet or film; shaped, such as pipe or tubing; or further processed, such as by blow molding into containers, etc.

The present invention also includes a process for making a coextruded multi-layer structure of two or more layers by coextruding a polyketone polymer with an other thermoplastic polymer, without the use of an adhesive or tie layer between the polymer layers, wherein the other thermoplastic polymer layer appears to adhere to the polyketone layer, yet will separate from the polyketone layer when either or both of the layers is impaired, for example, by cutting or shredding.

DETAILED DESCRIPTION OF THE INVENTION

The polyketone polymers of the invention are thermoplastic polymers of a linear alternating structure and contain substantially one molecule of carbon monoxide for each molecule of unsaturated hydrocarbon. Hereinafter, these polymers may be simply referred to as polyketones. Ethylenically unsaturated hydrocarbons suitable for use as precursors of the polyketone polymers have up to 20 carbon atoms inclusive, preferably up to 10 carbon atoms, and are aliphatic such as ethylene and other $\alpha$-olefins including propylene, 1-butene, isobutylene, 1-hexene, 1-octene and 1-dodecene, or are arylaliphatic, containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, preferably an $\alpha$-olefin such as pro-pylene. When the preferred polyketone terpolymers are employed, there will be within the terpolymer at least about 2 units derived from a monomer of ethylene for each unit derived from a monomer of the second hydrocarbon. Preferably, there will be from about 10 units to about 100 units derived from a monomer of ethylene for each unit derived from a monomer of the second hydrocarbon. The polymer chain of the preferred polyketone polymers has recurring units represented by the formula

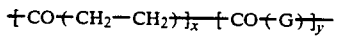

wherein G is derived from the monomer of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—(—CH$_2$—CH$_2$—)— units and the —CO—(—G—)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent, so the polymers are fairly represented by the formula for the polymer chain as depicted above.

Of particular interest are the polyketone polymers of number average molecular weight from about 1000 to about 200,000, particularly those of number average molecular weight from about 20,000 to about 90,000, as determined by gel permeation chromatography. The physical properties of the polymer will depend in part upon the molecular weight, whether the polymer is a copolymer or a terpolymer and, in the case of terpolymers, the nature and proportion of the second hydrocarbon present. Typical melting points for the polymers are from about 175° C. to about 300° C., more typically from about 210° C. to about 270° C. The polymers have a limiting viscosity number (LVN), measured in m-cresol at 60°C. in a standard capillary viscosity measuring device, from about 0.5 dl/g to about 10 dl/g, more frequently from about 0.8 dl/g to about 4 dl/g.

The polyketone polymers of the invention may include other polymers in amounts that are insufficient to significantly change the adhesion exhibited between the polyketone polymers and the other thermoplastic polymers of the invention.

U.S. Pat. No. 4,880,903 (Van Broekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt, or nickel, the anion of a strong non-hydrohalogenic acid, and a bidentate ligand of phosphorus, arsenic or antimony. U.S. Pat. No. 4,843,144 (Van Broekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The catalyst composition may be formed from a variety of materials, but without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated, for example, as by cooling the reactor and contents and releasing the pressure. The polyketone polymer is typically obtained as a product substantially insoluble in the reaction diluent and the product is recovered by conventional methods, such as filtration or decantation. The polyketone polymer is used as recovered or the polymer is purified, for example, by contact with a solvent or extraction agent which is selective for catalyst residues.

The other thermoplastic polymers of the invention are those which exhibit a mechanical bond when coextruded with a polyketone polymer. A mechanical bond occurs when the coextruded layers act as a single layer only until the integrity of either layer is impaired. For example, when coextruded with a polyketone polymer, such other thermoplastic polymers will form a multilayer structure with layers that may be flexed or kinked without delaminating, yet once either layer (or both) is cut through, the two polymer layers can be easily separated. The other thermoplastic polymers of the invention include cracked polybutylene, nylon-6, nylon-12, copolyetherester polymer, and polyvinyl chloride.

The cracked polybutylenes of the invention are thermoplastics and are preferably homopolymers. The polyolefins susceptible to cracking conditions are those having a polymer backbone that includes carbon atoms which have tertiary hydrogens attached (i.e. a carbon atom that is attached to three other carbon atoms and only one hydrogen atom). The polyolefins subjected to cracking conditions are preferably α-olefins, and preferably include from three to about eight carbon atoms. A cracked polyolefin results when a polyolefin is subjected to thermal and/or chemical processes to crack the heavier components, thereby narrowing the molecular weight distribution and increasing the melt flow index. Cracked polyolefins are well known in the art, and are produced by conventional methods. Cracked polybutylenes are commercially available, e.g. several grades are manufactured by Shell Chemical Company.

In order to obtain the mechanical bond of the invention, the melt flow index of the cracked polybutylene must be carefully selected. Melt flow index may be defined as the amount, in grams per minute (g/min), of polymer which flows through a capillary with a relatively small length/diameter ratio under ASTM D1238. Different conditions and temperatures apply for different polymers. For example, cracked polybutylenes with a melt flow index (determined using ASTM D1238 at Condition E, 190° C., 2160 g weight) of about 20 decigrams per minute (dg/m) or more exhibit a mechanical bond with a polyketone polymer. However, a cracked polybutylene with a melt flow index of only about 1.8 dg/min showed no adhesion to a polyketone polymer. Consequently, only cracked polybutylenes with a melt flow index of about 20 dg/min or more are considered to be of the invention.

The nylons of the invention are nylon-6 and nylon-12, both thermoplastic polyamide polymers. Nylon-6 is obtained by polymerizing 6-aminohexanoic acid ($\epsilon$-aminocaproic acid) or its lactam, caprolactam. Nylon-6 is also known as polycaprolactam, polypentamethylenecarbonamide, or poly(imino[1-oxohexamethylene]). Nylon-12 is obtained by polymerization of $\omega$-dodecanolactam. Nylon-12 is also known as poly($\omega$-dodecanolactam), or polyundecamethylenecarbonamide. Both nylon-6 and nylon-12 are well known in the art, and produced by conventional methods. Nylon-6 is commercially available, e.g. Zytel® 211, manufactured by DuPont Polymers. Nylon-12 is also commercially available, e.g. Vestamid® L2124 or L1940, manufactured by Hüls America.

The copolyetherester polymer of the invention is a thermoplastic polyetherester block copolymer that is a polycondensation product of dicarboxylic acids with dihydroxy alcohols. The copolyetherester comprises a number of recurring long chain ester units and short chain ester units connected head to tail through ester linkages. The long chain ester unit is a unit derived from a ether linkage-containing poly(alkylene oxide) glycol and a relatively low molecular weight dicarboxylic acid, and the short chain ester unit is derived from a relatively low molecular weight aliphatic diol and a relatively low molecular weight dicarboxylic acid. Incorporation of larger proportions of the ether-linkage-containing glycols gives such copolymers an elastomeric nature.

Preferred copolyetheresters are those wherein the long chain ester units are predominantly derived from poly(tetramethylene oxide)glycol, the short chain ester units are predominantly derived from tetramethylene diol, and the dicarboxylic acid is 1,4-phenylene dicarboxylic acid. Particularly preferred is a copolyetherester with repeating units of the formula:

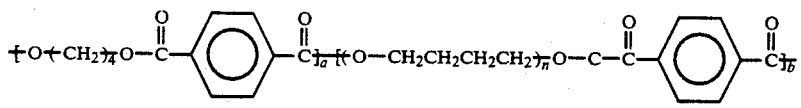

wherein n is an integer from about 10 to about 20, a and b independently are integers from 1 to about 100 and preferably 1 to about 50, and the ratio of a to b is from about 1:4 to about 1:9, and preferably from about 1:7 to about 1:9.

Such thermoplastic copolyetherester polymers are known in the art and produced by conventional methods. A preferred thermoplastic copolyetherester polymer is Hytrel® 5556, manufactured by DuPont Polymers.

The polyvinyl chloride (PVC) of the invention is made by polymerization of the vinyl chloride monomer, represented by the formula $CH_2{=}CHCl$. PVC typically includes plasticizers to improve impact. Both plasticized and unplasticized PVC are thermoplastic polymers well known in the art, and produced by conventional methods.

The polymers of the invention may also include conventional additives such as antioxidants and stabilizers, dyes, fillers or reinforcing agents, fire resistant materials, mold release agents, colorants and other materials designed to improve the processability of the polymers or the properties of the resulting products. Such additives are added prior to, or concurrent with the processing of the polyketone and the other thermoplastic polymers.

Coextrusion techniques and equipment are well known in the art. Coextrusion involves the extrusion of molten or plastified polymers through adjacent or multimanifold dies, such that the extrudates, still in molten, semi-molten, or plastified form, are brought together to form multi-ply structures or laminates. The feedblock and die(s) must be designed to preserve layer thicknesses as the molten polymers move downstream. The thickness of each ply usually is in the range of about 0.05 mils to about 50 mils or more, depending on the desired end use. The plies can be of the same thickness, or different. The material used in each ply is usually different from any adjacent ply, but can be repeated in the same multi-ply laminate. Film laminates typically have a thickness of from about 0.5 mils to about 10 mils, while sheet laminates (which are frequently used for thermoforming) typically have a thickness of from about 10 mils to about 100 mils or more. Similar techniques are used to produce both flat articles, such as films and sheet, shaped articles for packaging and other uses, and profiles, such as pipe and tubing.

The subject invention ma also be exploited through use of other methods, such as blow molding, insert molding, and injection molding. Blow molding, for example, involves placing a molten coextruded polymer tube or parison in a mold, and applying sufficient air pressure inside the parison to force it into the shape of the mold. Blow molding is particularly suitable for making bottles and other containers, toys, and various industrial items. The polyketone and other thermoplastic polymers may be processed by applying a molten layer of one polymer onto a finished artifact or solid insert prepared from the other polymer. Two-shot injection molding may be used to prepare shaped articles that would contain layers or sections of polyketone and other thermoplastic polymers, or an article of one polymer encapsulated within the other polymer. A crosshead die, for example, may be used to extrude one molten polymer over a rod or tube made from the other polymer. These and other methods may be utilized to exploit the mechanical bonding between polyketone and other thermoplastic polymers.

The method of producing the articles of the invention is not material so long as the multi-layer structures or other articles are produced without undue degradation of the polymer components.

The invention is further illustrated by the following Examples which should not be regarded as limiting.

EXAMPLE 1

A linear alternating terpolymer of carbon monoxide, ethylene, and propylene (DP MX500) was produced in the presence of a catalyst composition formed from palladium acetate, trifluoroacetic acid, and 1,3-bis[di(2-methoxyphenyl)phosphino]propane. The polyketone polymer had a melting point of about 220° C. and an LVN of about 1.8 dl/g when measured in m-cresol at 60° C. The polyketone polymer also contained conventional additives.

EXAMPLE 2

Bi-layered tubing was made from a polyketone terpolymer of Example 1 and three grades of cracked polybutylene: a highly cracked grade with a melt flow index of about 200 decigrams/minute (dg/min), a moderately cracked grade with a melt flow index of about 20 dg/min, and a lightly cracked grade, with a melt flow index of about 1.8 dg/min. The three polybutylenes were manufactured by Shell Chemical Company, and the melt flow index values were all determined using ASTM D1238, at Condition E (190° C., 2160 g weight). For comparison, bi-layered tubing was also made with a polypropylene/ethylene copolymer manufactured by Shell Chemical Company and a functionalized polypropylene, Admer® QF511A, manufactured by Mitsui Petrochemicals (both not of the invention).

The bi-layered tubing was made in a coextrusion process which utilized two Killion single-screw extruders. The compression ratio of the extruders was 3:1, and the length to diameter ratio was 24:1. A 1.5 inch diameter extruder was used to process the substrate polymer, and a 1 inch diameter extruder was used for the coating polymer. Both extruders fed into a single manifold coextrusion die. Best results with this type of die were obtained by starting the 1 inch diameter coating extruder first, followed by the 1.5 inch diameter substrate extruder, to prevent plugging in the die. The coextruded tubing was pulled at a rate of about 20 feet per minute from the die, through a weir sizer, and into a cooling tank. The coextruded tubing had a coating layer that was about 10 mils thick, and a substrate layer that was about 30 mils thick.

The polymers were processed as close as possible to the manufacturer's specifications. Each polybutylene and polypropylene was extruded as a coating over a molten polyketone substrate. The polyketone polymer was processed at a melt temperature between 232° and 243° C. Different melt and die temperatures were used for the various coating polymers. The melt temperatures and die temperatures for the other thermoplastics were: highly cracked polybutylene, 140° C. and 232° C.; moderately cracked polybutylene, 204° C. and 235° C.; lightly cracked polybutylene, 202° C. and 232° C.; polypropylene copolymer, 210° C. and 232° C.; and functionalized polypropylene, 216° C. and 235° C.

After cooling, the different types of tubing were flexed, kinked, and cut open longitudinally. The highly cracked polybutylene/polyketone and the moderately cracked polybutylene/polyketone tubings exhibited a mechanical bond between the layers. For these two polybutylenes, the polybutylene and polyketone layers acted as a single unit only until the integrity of either layer was impaired. The tubing could be flexed or kinked without delamination, however, once either layer was cut, the two layers were easily separated.

In comparison, the layers of the lightly cracked polybutylene/polyketone and polypropylene copolymer/polyketone tubings showed no adhesion. When flexed, the surface and substrate layers acted independently, resulting in an obvious delamination or gathering of the surface coating at the bend.

The functionalized polypropylene, in comparison, exhibited a strong adhesion, and could be separated from the polyketone only by applying a strong force by hand.

EXAMPLE 3

Bi-layered tubing was made from the polyketone terpolymer of Example 1 and two different thermoplastic nylons: nylon-6 and nylon-12. The nylon-6 was manufactured by DuPont Polymers. Two grades of nylon-12 were used, one with and one without a plasticizer, and both were manufactured by Hüls America. For comparison, bi-layered tubing was also made with a terpolymer of nylon-6, nylon-6,6, and nylon-12, Atochem H-30, manufactured by Atochem Polymers (not of the invention).

The tubing was made by the method of Example 2. Each nylon was extruded as a coating over a molten polyketone substrate. The nylon-6 was processed at a melt temperature of about 210° C., and at a die temperature of about 232° C. The plasticized nylon-12 was processed at a melt temperature of about 202° C., and at a die temperature of about 235° C. The unplasticized nylon-12 was processed at a melt temperature of about 188° C. and at a die temperature of about 235° C. The Atochem H-30 was processed at a melt temperature of about 210° C. and at a die temperature of about 232° C.

The nylon-6 and the nylon-12 (both with and without a plasticizer) exhibited a mechanical bond (as described in Example 2) with the polyketone polymer. In comparison, the Atochem H-30 exhibited a strong, interactive adhesion to the polyketone polymer. This tubing was flexed, kinked, and cut open, yet the two layers continued to act as a single unit. An attempt was made to separate the polyketone layer from the Atochem H-30 layer, however, the adhesion between the two layers was too great to allow separation without destroying one or both polymer layers.

EXAMPLE 4

Bi-layered tubing was made from the polyketone terpolymer of Example 1 and a thermoplastic copolyetherester polymer manufactured by DuPont Polymers.

The tubing was made by the method of Example 2. The copolyetherester was extruded as a coating over a molten polyketone substrate. The copolyetherester was processed at a melt temperature of about 210° C. and at a die temperature of about 232° C.

The copolyetherester exhibited a mechanical bond (as described in Example 2) with the polyketone polymer.

EXAMPLE 5

Bi-layered tubing was made from the polyketone terpolymer of Example 1 and a rigid polyvinyl chloride (PVC). For comparison, bi-layered tubing was also made with a polyvinylidene fluoride polymer (not of the invention). The PVC was an unplasticized grade manufactured by Westlake. The polyvinylidene fluoride was manufactured by Atochem Polymers.

The tubing was made by the method of Example 2, using a polyketone polymer as the substrate polymer. The PVC was processed at a melt temperature of about 202° C. and a die temperature of about 232° C. The polyvinylidene fluoride was processed at a melt temperature of about 238° C. and a die temperature of about 243° C.

The PVC exhibited a mechanical bond (as described in Example 2) with the polyketone polymer. In comparison, the polyvinylidene fluoride exhibited a strong, interactive adhesion to the polyketone polymer (as described in Example 3).

EXAMPLE 6

For comparison, an attempt was made to prepare bi-layered tubing from a polyketone polymer and a number of other thermoplastic polymers. However, none of these materials exhibited any adhesion to the polyketone polymer of the invention. A list of these polymers (not of the invention) is included as Table 1.

Other embodiments of the invention will be apparent to those skilled in the art from a consideration of this specification, or by practice of the invention described herein. It is intended that the specification and examples be considered as exemplary only, with the true scope and spirit of the invention being indicated by the following c aims.

TABLE 1

Polymers Exhibiting No Adhesion to Polyketone Polymers

| Polymer | Manufacturer | Trade Name |
|---|---|---|
| ethylene/methyl acrylate (EMA) (EMA) copolymer | DuPont Polymers | Vamac N-123 |
| ethylene/methacrylic acid copolymer | DuPont Polymers | Nucrel ® 535 |
| ethylene/methacrylic acid copolymer, partially neutralized | Dow Chemicals | Primacore ® 1460 |
| ethylene/vinyl alcohol copolymer | Eval Company | Eval EP F |
| ethylene/methacrylic acid copolymer, partially neutralized | DuPont Polymers | Surlyn ® 1601 |
| polyether block esteramide copolymer | Atochem Polymers | Pebax ® 4033 |
| bisphenol A polycarbonate | Miles | Makrolon M-40 |
| styrene/acrylonitrile copolymer | Monsanto Company | Lustran 31 |
| dynamically vulcanized thermoplastic polyolefin | Advanced Elastomer Systems | Santoprene 101/73 |

What is claimed is:

1. A coextruded bi-layer structure consisting essentially of:
   a first polymer layer consisting essentially of a linear alternating polyketone polymer of carbon monoxide and at least one α-olefin; and
   a second polymer layer selected from the group consisting of cracked polybutylenes, nylon-6, nylon-12, copolyetheresters and polyvinyl chloride said second polymer which appears to adhere to the first polymer layer, yet separates easily from the first polymer layer once the integrity of either layer is impaired.

2. The structure of claim 1 wherein the polyketone polymer has recurring units represented by the formula

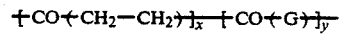

wherein G is derived from a monomer of an α-olefin of at least 3 carbon atoms polymerized through the ethylenic unsaturation and the ratio of y:x is no more than about 0.5.

3. A composite part comprising two or more polymer layers prepared by molding a first polymer consisting essentially of a linear alternating polyketone polymer of carbon monoxide and at least one α-olefin, and a second polymer selected from the group consisting of cracked polybutylene, nylon-6, nylon-12, copolyetherester, and polyvinyl chloride, wherein the first and second polymer layers appear to adhere to each other but will separate readily from each other once the integrity of either layer is impaired.

4. A coextruded multi-layer structure of at least two polymer layers comprising: a first polymer layer consisting essentially of a polyketone polymer having recurring units represented by the formula

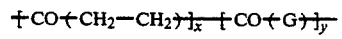

wherein G is derived from a monomer of an α-olefin of at least 3 carbon atoms polymerized through the ethylenic unsaturation and the ratio of y:x is no more than about 0.5, and a second polymer layer consisting essentially of a cracked polybutylene polymer with a melt flow index of about 20 decigrams per minute or more, and wherein the first polymer layer adheres to the second polymer layer, without the use of an adhesive or tie layer, in a mechanical bond, wherein the two polymer layers exhibit strong adhesion but can be easily separated once either layer is cut.

5. The structure of claim 4 wherein, in the linear alternating polymer, G is derived from a monomer of propylene and the ratio of y:x is from about 0.01 to about 0.1.

6. The structure of claim 4 wherein, in the linear alternating polymer, y is zero.

7. A coextruded multi-layer structure of at least two polymer layers comprising a first polymer layer consisting essentially of a polyketone polymer having recurring units represented by the formula

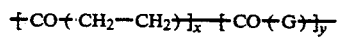

wherein G is derived from a monomer of an α-olefin of at least 3 carbon atoms polymerized through the ethylenic unsaturation and the ratio of y:x is no more than about 0.5, and a second polymer layer consisting essentially of nylon-6 or nylon-12, and wherein the first polymer layer adheres to the second polymer layer, without the use of an adhesive or tie layer, in a mechanical bond, wherein the two polymer layers exhibit strong adhesion but can be easily separated once either layer is cut.

8. The structure of claim 7 wherein, in the linear alternating polymer, G is derived from a monomer of propylene and the ratio of y:x is from about 0.01 to about 0.1.

9. The structure of claim 7 wherein, in the linear alternating polymer, y is zero.

10. A coextruded multi-layer structure of at least two polymer layers comprising a first polymer layer consisting essentially of a polyketone polymer having recurring units represented by the formula

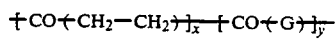

wherein G is derived from a monomer of an α-olefin of at least 3 carbon atoms polymerized through the ethylenic unsaturation and the ratio of y:x is no more than about 0.5, and a second polymer layer consisting essentially of a polyetherester polymer having recurring units represented by the formula

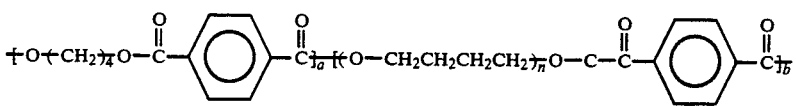

wherein n is an integer from about 10 to about 20, and the ratio of a to b is from about 1:4 to about 1:9, and wherein the first polymer layer adheres to the second polymer layer, without the use of an adhesive or tie layer, in a mechanical bond, wherein the two polymer layers exhibit strong adhesion but can be easily separated once either layer is cut.

11. The structure of claim 10 wherein, in the linear alternating polymer, G is derived from a monomer of propylene and the ratio of y:x is from about 0.01 to about 0.1.

12. The structure of claim 10 wherein, in the linear alternating polymer, y is zero.

13. A coextruded multi-layer structure of at least two polymer layers comprising a first polymer layer consisting essentially of a polyketone polymer having recurring units represented by the formula

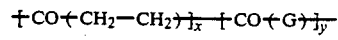

wherein G is derived from a monomer of an α-olefin of at least 3 carbon atoms polymerized through the ethylenic unsaturation and the ratio of y:x is no more than about 0.5, and a second polymer layer consisting essentially of polyvinyl chloride polymer, and wherein the first polymer layer adheres to the second polymer layer, without the use of an adhesive or tie layer, in a mechanical bond, wherein the two polymer layers exhibit strong adhesion but can be easily separated once either layer is cut.

14. The structure of claim 13 wherein, in the linear alternating polymer, G is derived from a monomer of propylene and the ratio of y:x is from about 0.01 to about 0.1.

15. The structure of claim 13 wherein, in the linear alternating polymer, y is zero.

* * * * *